Patented Feb. 11, 1941

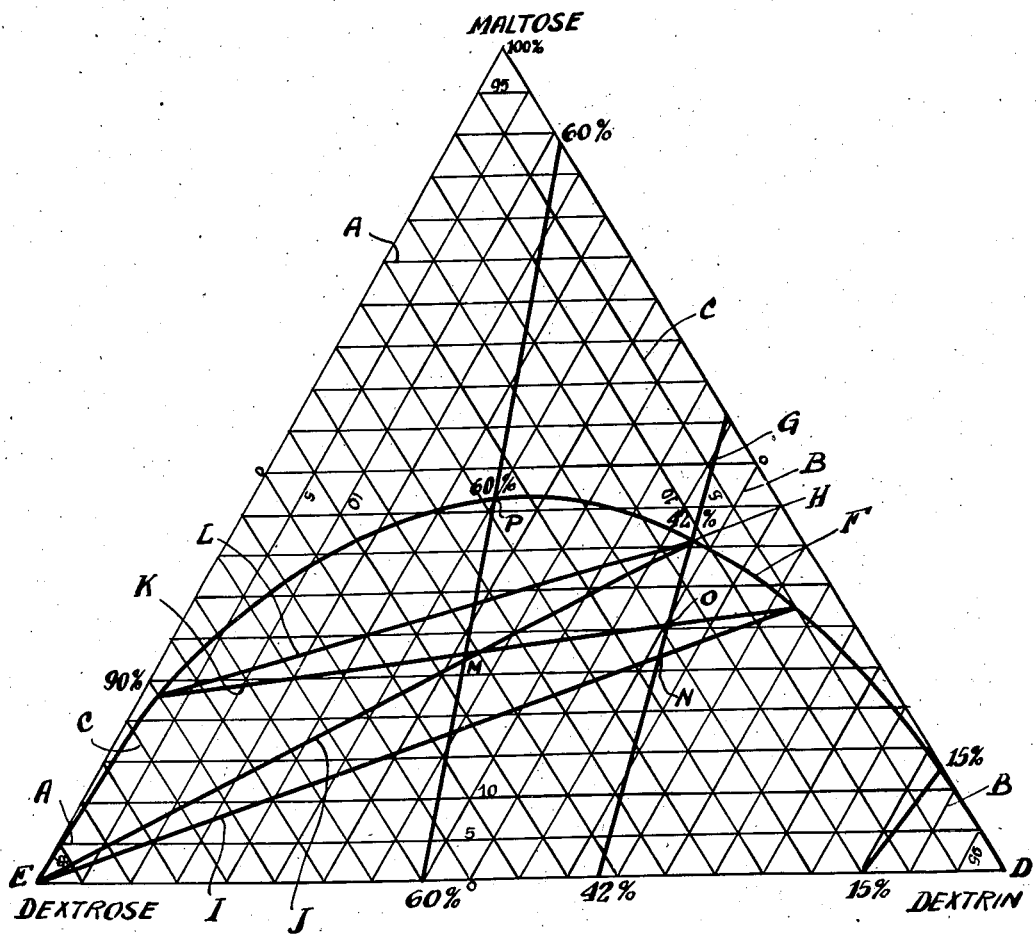

2,231,835

UNITED STATES PATENT OFFICE 2,231,835

NONHYGROSCOPIC SUGAR PRODUCT

James F. Walsh, Tuckahoe, N. Y., and Abraham H. Goodman, Hammond, Ind., assignors to American Maize-Products Company, a corporation of Maine Application September 9, 1939, Serial No. 294,058

13 Claims. (Cl. 127—30)

Our invention relates to solidified, noncrystalline starch conversion syrup products that have a tendency to absorb moisture and cake or lump and more particularly to combinations of such products with nonhygroscopic crystalline sugars which inhibit that tendency. This application is a continuation in part of our application Serial No. 170,764, filed October 25, 1937.

Prior attempts to produce the solidified syrup product for commercial use have met with serious difficulties, principally because the dried product was hygroscopic and lumped or caked into a solid mass on exposure to the atmosphere. The syrups normally used for producing the dehydrated products are obtained from starch, particularly corn starch, by well known conversion processes in which the starch is subjected to acid, heat and pressure. After conversion these syrups are concentrated to a heavy viscous form, a familiar commercial example of which is corn syrup. This product is a sticky viscous material and attempts to dehydrate it to a dry solid form have resulted generally in a hygroscopic product. Furthermore, the dehydrated solid corn syrup product has proven very difficult to package and market due to this hygroscopic property. When reduced to powder form and bagged the product tends to cake or stick together to form lumps or a solid mass. This difficulty is increased the higher the degree of conversion, that is, increase in amount of reducing sugars, but the caking tendency may be decreased by dehydrating the product down to a very low moisture content such as 3% or below.

The starch conversion syrups having a low reducing sugars content, as for example, 20% or below may be dried satisfactorily to obtain stable nonhygroscopic products. However, these products have limited commercial value due to their low sugar content and accordingly very little sweetness. They have poor fermentation capabilities and generally produce cloudy viscous solutions, or hard candies. The highest conversion products, namely, crystalline dextrose products possess the desired sweetness and will not cake or become deliquescent on exposure, but they do not possess the physical properties of the solidified conversion syrup which contains dextrins in addition to the reducing sugars. The intermediate starch conversion products or sugar syrups, such as commercial corn syrup, having a reducing sugars content which is intermediate those of the above mentioned low conversion syrups and crystalline dextrose, are desirable in that they possess a sufficient amount of dextrose for sweetness, are useful in fermentation and are substantially less expensive than the crystalline dextrose or similar nonhygroscopic crystalline sugars. However, these sugar syrups of intermediate reducing sugars content when solidified, possess the above described disadvantages of being highly hygroscopic and therefore difficult to maintain in a stable nonhygroscopic dry form. Furthermore, unless they are dried to a very low moisture content such as 3% or less they will be characterized by a plastic flow of the sugar particles into each other which is conducive to lumping and caking.

In accordance with the present invention we have discovered that the above difficulties may be overcome and a commercially satisfactory substantially dry, nonhygroscopic product having approximately any desired reducing sugars content may be obtained by properly blending a solid, water soluble, substantially nonhygroscopic, crystalline sugar with the dried amorphous starch syrup products of various dextrose contents. The two materials may be combined in various proportions ranging from about 5% to 95% of each ingredient. Examples of suitable solid, crystalline sugars which may be used are sucrose, dextrose, maltose hydrate and lactose. Levulose in chemically pure crystalline form may be used provided the humidity conditions do not exceed about 80 percent. It is less desirable than the other sugars mentioned because of a hygroscopic tendency and also because of its present scarcity as a commercial product. Examples of suitable starch conversion syrups are the dried solidified syrups obtained by hydrolysis of various starches such as found in corn, beans, peas, potatoes, etc.; the starch conversion syrups being dehydrated to solid, substantially dry form. The starch conversion syrup should contain at least 20% reducing sugars and advantageously between 25% and 65% reducing sugars. The liquid syrups to be dehydrated may be produced by acid, enzymatic or other suitable form of starch conversion accompanied by heat and pressure if desired.

We have found that when a nonhygroscopic crystalline sugar for example dextrose or sucrose is properly admixed with the dried solidified starch conversion syrup, the reducing sugars content of which may vary over a wide range including the highly hygroscopic products, the resulting product will be substantially nonhygroscopic, and may be packaged and shipped or stored over reasonably long periods of time without caking or lumping. For example, if a starch conversion syrup, e. g. commercial corn syrup, is dried to a solid form, which would be hygroscopic, and then this dried normally hygroscopic solid blended with one of the crystalline sugars, the resulting product will be substantially nonhygroscopic and stable. It will have practically negligible plastic flow so that it may be packaged, stored and shipped satisfactorily without caking. The dried solidified starch conversion syrup used in this product is not necessarily of very low moisture content such as would be essential if the nonhygroscopic crystalline sugar were not present. The crystalline sugar apparently has the property of taking up some of the residual moisture in the solidified starch conversion syrup and thereby preventing or inhibiting the normal plastic flow tendency of this amorphous solidified syrup. Also by blending with the solidified syrup a nonhygroscopic crystalline form of dextrose or other reducing sugar, the reducing sugars content of the combined product may be increased to practically any desired degree without increasing the hygroscopic property.

If the crystalline sugar which is added to the solidified syrup is a reducing sugar, such as dextrose, maltose, lactose or levulose, the reducing sugars content of the combined product is increased proportionately. Thus, if it is desired to use a solidified syrup having a low reducing sugars content such as 35% or below, this content may be increased to practically any desired higher amount by adding to the solidified syrup, one of the crystalline reducing sugars. In this manner a dry product having a relatively high reducing sugars content but still being stable against caking and other hygroscopic tendencies is obtained since the added reducing sugar is in a stable nonhygroscopic form, for example, crystalline dextrose.

If the crystalline sugar which is added to the solidified syrup, is a nonreducing sugar, e. g. sucrose, the reducing sugars content of the combined product is proportionately decreased. The added crystalline sucrose being a stable product will effect a stabilizing action on the normally hygroscopic solidified syrup to render the combined product stable against caking and other adverse hygroscopic properties. The amount of reducing sugars content of the finished product may vary over substantially any desired range. The reducing sugars content in the final product being reduced by the sucrose, the solidified syrup used may have a reducing sugars content very much higher than would normally be permissible in the syrup product alone. In other words, a syrup of any desired high degree of conversion may be made and the reducing sugars content reduced to a stable lower amount by addition of the sucrose.

Thus, as shown by the above the reducing sugars content of the solidified normally hygroscopic syrup may be increased or decreased over substantially any desired range by addition of the crystalline, reducing and nonreducing sugars respectively, and in all cases the hygroscopic properties of the solidified syrup reduced to a satisfactory minimum. The increase in reducing sugars value of the solidified syrup by addition of a crystalline reducing sugar will vary in amount with the different reducing values of the respective sugars. For example, on a comparative basis, dextrose has a reducing value of 100, lactose, 67.8, and maltose 62.

The blended product of our invention may be made by any suitable mixing or blending procedure for example, by means of a mechanical mixer with rotating paddle or the two materials may be ground together. The amorphous dried solidified syrup may be first reduced to powder or granular form before mixing with the crystalline sugar.

The products of our invention are characterized by nonhygroscopicity, lightness in color and less thermoplasticity than the solidified syrups alone. Solutions of our product have a lower viscosity than the solidified syrup product alone due to the lower dextrin content. Microscopically our products distinguish from the solidified syrups in that they are made up of a mixture of crystals of the nonhygroscopic crystalline sugar with glassy, noncrystalline or amorphous particles of the dehydrated solidified starch conversion syrup.

The dried solidified starch conversion syrups are made up primarily of dextrins, maltose and dextrose. The respective amounts of these constituents will vary with the degree of conversion of the starch from which they are made. The dextrose content increases with increase in conversion and the maltose and dextrins decrease. A highly converted syrup therefore will contain a high percent of dextrose as compared with a syrup of low conversion.

Now, when a crystalline sugar, such as those mentioned above, is added to the solidified starch conversion syrup, the composition of the resulting product may vary from that of the solidified syrup both in percentage of ingredients and in kinds of ingredients. For example, if the crystalline sugar which is added to the solidified syrup, is maltose, the composition of the solidified syrup will be changed in percentage only since maltose is already one of the constituents of the solidified syrup. The added crystalline maltose will increase the percentage of maltose originally present in the solidified syrup. Likewise, if crystalline dextrose is added to the solidified starch conversion syrup, the composition of the latter is changed only from a percentage standpoint since that syrup already contains dextrose as a constituent. Accordingly, by the addition of dextrose to the solidified starch conversion syrup the dextrose percentage of the blended product is increased; the maltose and dextrin contents being decreased proportionately. Therefore, by the addition to the solidified syrup of a crystalline sugar which is already contained in some amount in that syrup, the resulting product still has only three major components, namely, dextrose, maltose and dextrins.

If the crystalline sugar which is added to the solidified syrup is not dextrose or maltose, but is nevertheless a reducing sugar such as levulose, or lactose, the reducing sugars content of the resulting product will be increased in accordance with the amount of reducing sugars added. The dextrose and maltose constituents of the solidified starch conversion syrup are reducing sugars and are normally considered together in determining the amount of reducing sugars present in the material. Therefore, when another reducing sugar is added the total amount of reducing sugars in the composition is increased.

If the crystalline sugar which is added to the solidified syrup is not a reducing sugar, it will constitute a fourth component in the resulting product, that is, the product will contain dextrose, maltose, dextrins and the nonreducing sugar. An example of the latter is sucrose and as explained above, this crystalline sugar also has the property of reducing the hygroscopic tendencies of the dried solidified starch conversion syrup. When the nonreducing sugar sucrose is added to the solidified syrup, the amount of reducing sugar as well as the dextrins actually present in the final product will be decreased in proportion to the amount which was originally present in the solidified syrup. That is, the fourth component sucrose, is one of the constituents in the final product and decreases the percentage of the whole occupied by the reducing sugars, maltose and dextrose. To illustrate the percentage composition of the dried starch conversion syrup and also the percentage composition of the blended product made up of the solidified syrup and the added crystalline sugar, the triangular diagram is given in the accompanying drawing. For the sake of simplicity the compositions represented by the diagram are the compositions of the solidified starch conversion syrup resulting from varying degrees of conversion and the composition of final products obtained by blending with the solidified starch conversion syrup varying amounts of crystalline dextrose.

It will be seen from the diagram that the amounts, on a dry basis, of the general components of the solidified starch conversion syrup, namely, dextrins, dextrose and maltose, are represented by the three different sets of intersecting lines which compose the triangle. The transverse or base lines A represent the maltose content; the oblique lines B represent the dextrin content, and the oblique lines C represent the actual dextrose content. In this diagram the per cent of each of the three general components in the solids increases as we move in a direction approaching the respective corners; thus, the amount of maltose, is shown by the base lines approaching the apex which represents 100% maltose. The lower right hand corner D of the triangle represents 100% dextrin and the lower left hand corner E represents 100% dextrose. The curved line F represents the changing compositions of various direct conversion starch sugars, the degree of conversion increasing as we proceed along this line towards the left.

Since maltose and dextrose alone show reducing value, the dextrins being nonreducers, then it is possible to draw vertically inclined lines within the triangle shown in the drawing that will describe all possible combinations of maltose, dextrose, and conversion dextrins of equal reducing sugar values. Thus, any composition represented by any point on line G, has a 42% reducing value, the reducing sugars being calculated as though they were dextrose only as is general in this art. The point H represents ordinary 42% reducing value corn syrup made by direct starch conversion which is composed of approximately 40.4% maltose, 11.6% dextrose, and 46.0% dextrins. This is the only 42% reducing value sugar of all possible compositions on line G which can be produced by direct starch conversion.

For making the combined products of our invention we may add to the above described direct conversion products (compositions on curved line F) in powdered dried form, a crystalline sugar such as crystalline dextrose. The resulting sugar mixture possesses markedly improved stability over the direct conversion products represented by curved line F. For example, we may mix a dried sugar syrup product of 31% reducing sugars value with dextrose hydrate. Depending upon the amounts of each used we may prepare any composition represented in the digram by line I. Mixing crystalline dextrose with a dried corn syrup of reducing sugars value of 42% will permit making the compositions defined by line J, ranging up to 100% reducing value. By mixing a crystalline conversion product having a reducing value of about 90% which is commonly known as "70" or "80" sugar with a glass or amorphous type of dried sugar syrup of 31% or 42% reducing value, will permit compositions of the range shown by lines K and L.

The following illustrative but nonlimiting examples are given to illustrate further the type of products and procedures which characterize our invention.

Example I

In this example we dry a 42% reducing sugar corn starch conversion product in a vacuum pan and with agitation by the usual means, until a moisture content of about 6% or below is reached. The resulting dehydrated syrup is then poured into pans for solidifying or is otherwise cooled. The product is a hard glass-like solid which may be fractured and powdered.

We may also dry the starch conversion syrup by other suitable means such as, for example, spray drying, in which the syrup is finely atomized and is thrown into a warm current of air. The product resulting from this spray drying treatment consists of small vitreous particles generally spherical in shape and which for our purposes are equally suitable and similar in action to the above described powdered product prepared by grinding. The glassy amorphous sugar prepared as above in any suitable physical form is then mixed with the crystalline sugar, e. g. dextrose hydrate.

To prepare a blended product of, for example, 60% reducing value we blend with each 100 pounds of a glassy 42% reducing sugar of 3% moisture, about 47.9 pounds dextrose hydrate crystals (water content 9.1%). The crystals may be either small whole crystals or a ground powder made from crystals and in which the fragments are still crystalline. The blended product thus secured will be composed of 60% reducing sugars based upon the weight of total dry solids and will contain 5% of water.

Example II

We may use crystalline anhydrous dextrose in place of the dextrose hydrate mentioned above in the first example. Thus, to 160 pounds of the powdered glassy 42% conversion product we would add about 43.5 pounds of the anhydrous crystals. In this case the resulting product would be of 60% reducing sugar value based upon the weight of total solids and would contain 2.1% water.

While the use of the hydrate increases the water content and the anhydrous sugar decreases the water content in the finished products we find that the moisture content supplied by the hydrate has very little influence on the hygroscopic and other properties of the mixed products. The products produced according to the above two examples are about equally stable and practicable. The dry solids in the products in each of these two examples are represented by point M on the diagram and are composed of approximately:

| | Per cent |
|---|---|
| Dextrose (31% crystalline dextrose in mix) | 42.0 |
| Maltose | 26.5 |
| Dextrins | 31.5 |
| | 100.0 |

This composition may be contrasted with a direct starch conversion product alone such as is represented by point F in the drawing and which has approximately the following composition:

| | Per cent |
|---|---|
| Dextrose (0% crystalline dextrose) | 29.0 |
| Maltose | 46.0 |
| Dextrins | 25.0 |
| | 100.0 |

Example III

We may prepare a product having 42% reducing sugars in the total solids by mixing 100 pounds of a glassy, low conversion dried sugar product of 31% reducing sugar content and about 4% water content produced by one of the conversion and drying processes described above, with about 18.1 pounds of anhydrous crystalline dextrose or with about 19.9 pounds of dextrose hydrate. These two products differ slightly in moisture content, being about 3.4% and 4.2% respectively. The solids composition of these mixes is represented by point N on the attached drawing and consists of approximately:

| | Per cent |
|---|---|
| Dextrose (15.9) | 22.2 |
| Maltose | 26.5 |
| Dextrins | 51.3 |
| | 100.0 |

This composition may be contrasted with the solids composition of a direct starch converted corn syrup alone, such as is represented by point H in the drawing and which has the approximate following composition:

| | Per cent |
|---|---|
| Dextrose (0% crystalline dextrose) | 11.6 |
| Maltose | 40.4 |
| Dextrins | 48.0 |
| | 100.0 |

As a specific example of the use of a high reducing sugar containing dextrose in crystalline form but not pure dextrose, we may use the so-called "70" sugar or pressed products made therefrom. Thus a product of 42% reducing value, such as described in the second example given above may be made by mixing approximately 100 pounds of a glassy 31% reducing sugar product containing say 4% water with approximately 24.6 pounds of so-called "80" sugar. The latter has reducing sugars to the extent of about 90% of the total solids present and may contain about 11% water. The mixed product will then contain about 5.4% water. In order to secure products of lower moisture content, we may pre-dry the "80" sugar below the 11% water indicated which is merely the approximate average found in this commercial product.

The mixed sugar product, which has a 42% reducing value content is different in its properties from dried, solidified, direct converted products of this same reducing value. Particularly, it is a substantially non-hygroscopic product whereas the direct conversion product of 42% reducing value, when solidified, has strong hygroscopic properties. Also, as seen from the following composition which is represented by point O in the drawing, it is different from the products prepared according to the second example above:

| | Per cent |
|---|---|
| Dextrose (14% crystalline dextrose in mix) | 19.0 |
| Maltose | 30.3 |
| Dextrins | 50.7 |
| | 100.0 |

The following examples show the preparation of blended products in which a crystalline sugar other than dextrose is added to the solidified starch conversion syrup.

Example IV

To 100 pounds of a glassy solidified syrup having a 31% reducing sugars content and about 4% moisture and prepared as described above, we add about 18.1 pounds of lactose, $C_{12}H_{22}O_{11}.H_2O$. The resulting product has a reducing sugars value of 36.6% and contains about 4.3% water. The percentage composition of this product would be approximately as follows:

| | Per cent |
|---|---|
| Dextrose | 6.9 |
| Maltose | 26.5 |
| Dextrins | 51.3 |
| Lactose | 15.3 |
| | 100.0 |

Example V

To 100 pounds of a glassy solidified corn syrup having about 42% reducing sugars content and about 3% moisture, is added 43.5 pounds of crystalline sucrose. The resulting product has a reducing sugars value of 29.3% and contains about 2.1% water. The percentage composition of this product would be approximately as follows:

| | Per cent |
|---|---|
| Dextrose | 8.1 |
| Maltose | 28.1 |
| Dextrins | 33.5 |
| Sucrose | 30.3 |
| | 100.0 |

The combined crystalline sugar and solidified amorphous starch conversion syrup of our invention may be used in various edible products such as bakery products, candies, ice cream mixes, etc.

The term "nonhygroscopic" as used in the specification and claims herein to identify the products of this invention is intended to cover principally those products that are sufficiently non-hygroscopic to permit packaging and storing in the ordinary manner without lumping or caking of the material over a reasonable period of time, and are not limited to completely nonhygroscopic products that will not absorb any moisture.

It is to be understood that our invention is not limited to the specific examples and procedures described hereinabove but is subject to various modifications and changes. Some of the novel features of our invention are defined in the appended claims.

We claim:

1. A substantially dry, water soluble, nonhygroscopic, starch conversion product comprising a mixture of at least 5% and not substantially more than 95% of solid crystalline dextrose and the remainder dried, solid, converted corn syrup.

2. A substantially dry, water soluble, nonhygroscopic sugar product comprising an intimate admixture of approximately 5% to 25% crystalline dextrose and the remainder a dried starch conversion syrup having a reducing sugars content of approximately 27% to 60%.

3. A substantially dry, water soluble, nonhygroscopic sugar product comprising an intimate admixture of approximately 5% to 25% of a crystalline conversion product having a reducing sugars value of approximately 85% to 95% and a dried amorphous glass-like sugar syrup having a reducing sugars value of approximately 27% to 60%.

4. A substantially dry, water soluble, nonhygroscopic starch conversion product comprising a blend of approximately 5% to 95% solid dextrose from corn and approximately 95% to 5% of dried, solid, converted corn syrup.

5. A substantially dry, water soluble, nonhygroscopic, starch conversion product comprising a blend of approximately 5% to 25% solid dextrose from corn and approximately 95% to 75% of dried, solid, converted corn syrup.

6. A substantially dry, water soluble, nonhygroscopic starch conversion product comprising a blend of approximately 15% solid dextrose from corn and approximately 85% of dried, solid, converted corn syrup.

7. A substantially dry, water soluble, nonhygroscopic edible product comprising a mixture of about 5% to 95% of solid crystalline sucrose and the remainder a dried solidified amorphous corn syrup containing reducing sugars maltose and dextrose in amount of about 20%–65% and the remainder principally dextrins, said sucrose being present in sufficient amount to decrease the proportion of reducing sugars in the entire product to a point where the product is stable against plastic flow and hygroscopic properties.

8. A substantially dry, water soluble, nonhygroscopic, edible product comprising a mixture of about 5% to 95% of solid anhydrous dextrose and the remainder a dried solidified amorphous starch conversion syrup containing reducing sugars maltose and dextrose in amount of about 20%–65% and the remainder principally dextrins, said anhydrous dextrose being present in sufficient amount to increase the proportion of reducing sugars in the entire product to a point where the product is stable against plastic flow and hygroscopic properties.

9. A substantially dry, water soluble, nonhygroscopic edible product comprising a mixture of about 5% to 95% of a solid, water soluble, crystalline, nonhygroscopic sugar and the remainder a dried solidified starch conversion syrup containing reducing sugars maltose and dextrose in amount of about 20% to 65% and the remainder principally dextrins, said nonhygroscopic sugar being present in proper amount to regulate the proportion of reducing sugars in the entire product to a point where the product is stable against plastic flow and hygroscopic properties.

10. A substantially, dry, water soluble, nonhygroscopic edible product comprising a mixture of about 5% to 95% comminuted, solid, crystalline nonhygroscopic sucrose and the remainder a dried solidified starch conversion syrup containing reducing sugars maltose and dextrose in amount of about 20%–65% and the remainder principally dextrins, said sucrose being present in sufficient amount to decrease the proportion of reducing sugars in the entire product to a point where the product is stable against plastic flow and hygroscopic properties.

11. A substantially dry, water soluble, nonhygroscopic edible conversion product comprising a mixture of about 5% to 95% comminuted, solid, crystalline nonhygroscopic lactose and the remainder a dried solidified starch conversion syrup containing reducing sugars maltose and dextrose in amount of about 20%-65% and the remainder principally dextrins, said lactose being present in sufficient amount to increase the proportion of reducing sugars in the entire product to a point where the product is stable against plastic flow and hygroscopic properties.

12. A substantially dry water soluble, nonhygroscopic edible product comprising an intimate admixture of a dried solidified starch conversion syrup containing the reducing sugars maltose and dextrose in amount of about 20% to 65% and the remainder principally dextrins, and a comminuted solid crystalline substantially nonhygroscopic reducing sugar which is present in sufficient amount to increase the reducing sugars content of the entire product to the desired extent in excess of the reducing sugars content in said solidified syrup but without rendering the product unstable from the standpoint of plastic flow and hygroscopic properties.

13. In a substantially dry water soluble, nonhygroscopic edible product containing a blend of solidified starch conversion syrup and a nonhygroscopic crystalline sugar, the improvement of increasing substantially the original amount of reducing sugars in said product to a desired amount without increasing the hygroscopic properties of said product by adding to said product a substantial amount of a nonhygroscopic crystalline reducing sugar, which increases the reducing sugars content to the desired value and concomitantly maintains the product in a stabilized form resistant to plastic flow and hygroscopic properties.

ABRAHAM H. GOODMAN.
JAMES F. WALSH.